Feb. 11, 1969   F. M. PENDOLEY, JR., ET AL   3,426,974
VARIABLE AREA NOZZLE SYNCHRONOUS HINGE
Filed April 7, 1967
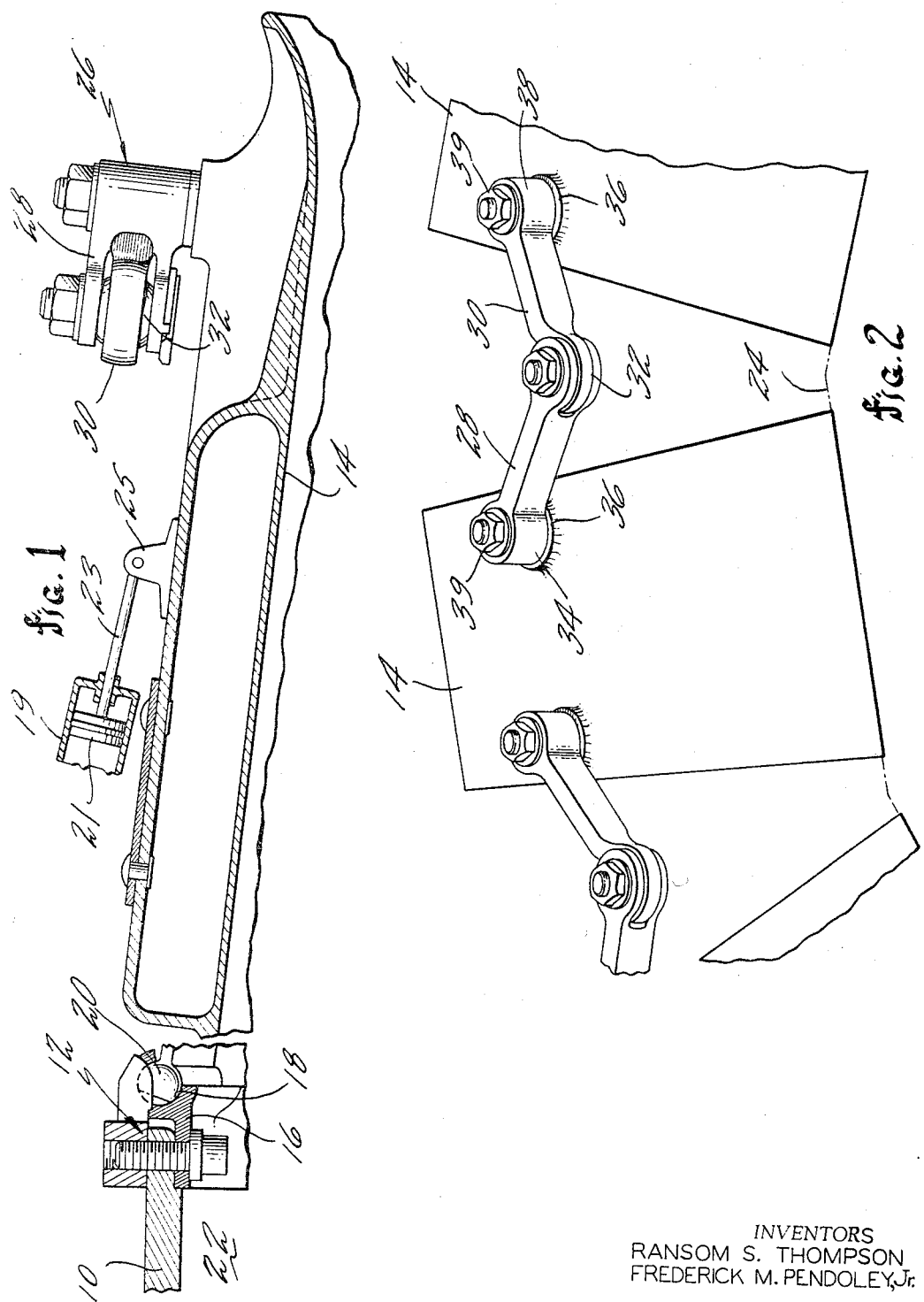
INVENTORS
RANSOM S. THOMPSON
FREDERICK M. PENDOLEY, Jr.
BY  *Charles A. Warren*
ATTORNEY

United States Patent Office 3,426,974
Patented Feb. 11, 1969

3,426,974
VARIABLE AREA NOZZLE SYNCHRONOUS HINGE
Frederick M. Pendoley, Jr., Collinsville, and Ransom S. Thompson, Middle Haddam, Conn., assignors to United Aircraft Corporation, East Hartford, Conn., a corporation of Delaware
Filed Apr. 7, 1967, Ser. No. 629,126
U.S. Cl. 239—265.39
Int. Cl. B64c 15/06
6 Claims

ABSTRACT OF THE DISCLOSURE

A variable area exhaust nozzle for a gas turbine engine wherein a plurality of link assemblies are mounted between the movable nozzle flaps to provide synchronous movement of said nozzle flaps.

Background of the invention

This invention relates to a variable area nozzle and more particularly to a hinged flap-type variable area nozzle adapted for use in a gas turbine engine.

When a variable area nozzle has been employed it has been recognized that it is extremely important from a performance standpoint to have the individual nozzle flaps move simultaneously or equally. The prior art in this area has employed several approaches, among them being the use of intermeshing gears mounted on adjacent flaps, as typified in U.S. Patent No. 2,928,234. Another approach that has been employed is the use of links interconnected to an intermediate link which is connected to ground or structural support member.

However, a major disadvantage to these schemes is that they place a flow blockage in the flow path around the nozzle flaps while substantially increasing the weight and cost of the engine. While the intermeshing gear approach does not increase the flow blockage around the nozzle, it does increase the weight and cost of the engine.

Summary of the invention

It is the primary object of this invention to provide a variable area nozzle wherein the nozzle flaps move synchronously while minimizing flow blockage.

The present invention relates to a flap-type variable area exhaust nozzle in which the individual flaps are hinged at their upstream end to supporting means carried by an engine casing. The flaps are actuated causing them to be moved radially inward or outward. Connecting each flap to its adjacent flap is a pivotally connected linkage mounted on pivots rigidly attached to the flaps. The fixed pivots are substantially perpendicular to the average flap surface and constrain the associated link mounted thereto to move in a plane perpendicular to the centerline of the pivot and therefore substantially parallel to the average flap surface. Each link is pivotally interconnected at its end distal from the flap mounted pivot end, this pivotal interconnection accommodating angular misalignment between the two links while enforcing the spatial commonality of the outboard ends of the centerlines of the two links.

Any movement of one flap about its upstream hinge will radially displace the plane in which its link is free to rotate about the fixed pivot on that flap. Since the pivotal connection joining the ends of the links enforces a common position for the outboard ends of each link, the adjacent flap is forced to rotate about its upstream hinge sufficiently to make the plane, in which its link rotates about its pivot, intersect the plane in which the other link rotates about its pivot at a location compatible with the link lengths and flap post positions. The forces necessary to rotate the adjacent flap about its upstream hinge are transmitted from the actuated flap link to the pivotal connection and then through bending loads in the other link to the adjacent flap pivot where these forces appear as force axial to the pivot and as a couple opposing the link bending load.

The present invention eliminates a number of members commonly employed by the prior art and accordingly satisfies the objective of decreasing flow blockage around the nozzle flaps while also reducing the weight of the engine.

Brief description of the drawings

FIGURE 1 is a fragmentary sectional view of a hinged variable area nozzle showing the device of the invention thereof.

FIGURE 2 is a schematic representation showing the devic of the invention thereof.

Description of the preferred embodiment

Referring first to FIGURE 1 for a description of an illustrated embodiment of the invention, engine casing 10 is connected to flap support assembly 12 which in turn supports flap 14.

Flap support assembly includes flange 16, the downstream end of which is in the form of a socket 18. Cooperating within socket 18 is ball hinge 20, ball hinge 20 being the upstream portion of flap 14. Connected to flap 14 is actuating means, a portion of which is shown. Cylinder 19 carries piston 21, piston 21 having a projecting rod 23 the downstream end of which is connected to projecting lug 25 which is mounted on flap 14. Fluid under pressure is admitted through a conduit (not shown) to the upstream end of the cylinder to supply the actuating force for moving the flaps into position. For a more complete description, reference is made to the Brown patent, U.S. No. 2,928,234, and incorporated herewith. It is to be understood that there are a plurality of flaps 14 and that these flaps are arranged circumferentially around duct 22 defined by casing 10. Inasmuch as flaps 14 are arranged circumferentially around duct 22, the hinge centerlines 24, indicated schematically on FIGURE 2, are at an obtuse angle with respect to one another although the radial plane of hinge 20 is perpendicular to the engine centerline. The movement of flaps 14 when actuated is radially inward or outward and circumferentially towards or away from one another, the direction depending upon the desired position of flaps 14.

To insure that flaps 14 move synchronously, link assembly 26 is provided between adjacent flaps. Link assembly 26 includes link 28 and link 30 interconnected at one end of each link by ball joint 32. End 34 of link 28 distal from ball joint connection 32 is mounted on fixed pivot 36 carried in flap 14. Similarly, distal end 38 of link 30 is mounted on fixed pivot 36 carried by an adjacent flap 14. In the embodiment shown, fixed pivots 36 are mounted on the downstream ends of adjacent flaps 14 but it is to be understood that such mounting location is not limited thereto. Fixed pivots 36 are threaded over a portion of its outermost length for receiving nut 39.

When link ends 34 and 38 are positioned on fixed pivots 36 and attached to the common ball joint 32, radial movement with respect to one another of ends 34 and 38 is prevented. Nut 38 serves as a positive locking means to this end. It should be clear therefore that when flaps 14 are actuated, links 28 and 30 through their connections to fixed pivots 36 cause synchronous movement of flaps 14. To accommodate the compound motion of the flaps due to the arrangement of the hinge centerlines previously noted, ball joint 32 is provided.

It is to be understood that the invention is not limited to the specific embodiment herein illustrated and described, but may be used in other ways without departure from its spirit as defined by the following claims.

We claim:
1. A variable area nozzle including a casing defining a duct, a plurality of nozzle flaps arranged circumferentially around said duct, supporting means for said flaps, said flaps being pivotally hinged at their upstream end to said supporting means, and means for causing said nozzle flaps to move radially inward and outwardly thereby varying the area of said nozzle, wherein the improvement comprises:
 a plurality of link assemblies connecting adjacent pairs of flaps, each of said assemblies including at least two links pivotally interconnected at one end of each link; and
 a fixed pivot mounted on each of said flaps, each pivot being a post which extends outwardly from each of said flaps substantially radially of the casing axis, the ends distal from said interconnection being mounted on the associated fixed pivot whereby the end of each link from said interconnection is movable in the same plane with respect to one another so that when said nozzle flaps are caused to move each of said link assemblies causes synchronous movement of the nozzle flaps connected thereto.

2. A construction as in claim 1 wherein:
each of the distal link ends has an aperture which cooperates with an associated fixed pivot.

3. A construction as in claim 1 wherein:
said fixed pivot is threaded over a portion of its length; and
locking means are provided which cooperate with said threads thereby preventing any movement of the distal end axially on its respective pivot.

4. A variable area nozzle including a casing defining a duct, a plurality of nozzle flaps arranged circumferentially around said duct, supporting means for said flaps, said flaps being pivotally hinged at their upstream end to said supporting means, and means for causing said nozzle flaps to move radially inward and outward thereby varying the area of said nozzle, wherein the improvement comprises:
 the centerlines of adjacent hinges for said flaps are at an obtuse angle with respect to one another;
 a plurality of link assemblies connecting adjacent pairs of flaps, each of said assemblies including at least two links interconnected by a ball joint at one end of each link; and
 a fixed pivot mounted on each of said flaps, each pivot being a post which extends outwardly from each of said flaps substantially radially of the casing axis, the ends distal from said interconnection being movable on the associated fixed pivot whereby the end of each link distal from said interconnection is movable in the same plane with respect to one another so that when said nozzle flaps are moved each of said link assemblies causes synchronous movement of the nozzle flaps connected thereto.

5. A construction as in claim 4 wherein:
each of the distal link ends has an aperture which cooperates with an associated fixed pivot.

6. A construction as in claim 4 wherein:
said fixed pivot is threaded over a portion of its length; and
locking means are provided which cooperates with said threads thereby preventing any movement of the distal end axially on its respective pivot.

References Cited

UNITED STATES PATENTS

| | | | |
|---|---|---|---|
| 2,697,907 | 12/1954 | Gaubatz | 239—265.39 |
| 2,708,825 | 5/1955 | Neary | 239—265.37 |
| 2,926,491 | 3/1960 | Hyde | 239—265.41 |
| 3,004,385 | 10/1961 | Spears | 239—265.41 |

ALLEN N. KNOWLES, *Primary Examiner.*